US007676388B2

(12) United States Patent
Parankirinathan

(10) Patent No.: US 7,676,388 B2
(45) Date of Patent: Mar. 9, 2010

(54) SURVIVAL RISK INSURANCE

(76) Inventor: Kiritharan Parankirinathan, 3 Timber Springs Rd., New Fairfield, CT (US) 06812

( * ) Notice: Subject to any disclaimer, the term of this patent is extended or adjusted under 35 U.S.C. 154(b) by 1252 days.

(21) Appl. No.: 11/197,251

(22) Filed: Aug. 4, 2005

(65) Prior Publication Data

US 2005/0267785 A1 Dec. 1, 2005

Related U.S. Application Data

(62) Division of application No. 10/743,201, filed on Dec. 22, 2003, now Pat. No. 6,999,935.

(60) Provisional application No. 60/507,170, filed on Sep. 30, 2003.

(51) Int. Cl.
*G06Q 00/40* (2006.01)
(52) U.S. Cl. ......................................... 705/4
(58) Field of Classification Search ................ 705/4, 705/35–45
See application file for complete search history.

(56) References Cited

U.S. PATENT DOCUMENTS

| | | | | |
|---|---|---|---|---|
| 4,839,804 A * | 6/1989 | Roberts et al. ............ | 705/36 R |
| 5,083,270 A | 1/1992 | Gross et al. | |
| 5,136,502 A | 8/1992 | Van Remortel et al. | |
| 5,590,037 A * | 12/1996 | Ryan et al. ............... | 705/4 |
| 5,592,379 A | 1/1997 | Finfrock et al. | |
| 5,752,236 A * | 5/1998 | Sexton et al. ............. | 705/4 |
| 5,926,800 A | 7/1999 | Baronowski et al. | |
| 5,966,693 A * | 10/1999 | Burgess .................. | 705/4 |
| 5,974,390 A * | 10/1999 | Ross ....................... | 705/36 R |
| 6,330,541 B1 | 12/2001 | Meyer et al. | |
| 6,393,405 B1 | 5/2002 | Vicente | |
| 6,584,446 B1 * | 6/2003 | Buchanan et al. ......... | 705/4 |
| 6,604,080 B1 * | 8/2003 | Kern ...................... | 705/4 |
| 6,611,815 B1 * | 8/2003 | Lewis et al. .............. | 705/36 R |
| 7,392,201 B1 * | 6/2008 | Binns et al. .............. | 705/4 |
| 7,533,045 B1 * | 5/2009 | Lange et al. ............. | 705/35 |
| 2001/0047325 A1 | 11/2001 | Livingston | |
| 2003/0074232 A1 | 4/2003 | Lee | |
| 2003/0083975 A1 | 5/2003 | O'Grady et al. | |
| 2003/0088430 A1 | 5/2003 | Ruark | |
| 2003/0088444 A1 * | 5/2003 | Garbin et al. ............. | 705/4 |
| 2003/0158758 A1 * | 8/2003 | Kanazawa et al. ......... | 705/4 |
| 2003/0200121 A1 * | 10/2003 | Santoloci ................ | 705/4 |
| 2003/0208385 A1 | 11/2003 | Zander et al. | |
| 2004/0010426 A1 * | 1/2004 | Berdou .................. | 705/4 |
| 2004/0030589 A1 * | 2/2004 | Leisher et al. ............ | 705/4 |
| 2004/0064391 A1 * | 4/2004 | Lange .................... | 705/36 |
| 2004/0177021 A1 | 9/2004 | Carlson et al. | |
| 2004/0236612 A1 * | 11/2004 | Heusinkveld et al. ...... | 705/4 |
| 2004/0267647 A1 * | 12/2004 | Brisbois ................. | 705/35 |
| 2005/0060209 A1 | 3/2005 | Hill et al. | |
| 2005/0086156 A1 * | 4/2005 | Conroy et al. ............ | 705/38 |

FOREIGN PATENT DOCUMENTS

| | | |
|---|---|---|
| EP | 00978795 A2 | 2/2000 |
| JP | 2004/110418 A | 8/2002 |
| WO | WO 02/065248 | 8/2002 |
| WO | WO2004/013794 A2 | 2/2004 |
| WO | WO 2004013794 * | 12/2004 |

OTHER PUBLICATIONS

Philipot, Tom."Guarding your assets with a life insurance trust." Kiplinger's Personal Finance Magazine, vol. 48, No. 4 p. 115, Apr. 1994.*
"Viatical Reinsurance Latest Signs of Change", *National Underwriter—Life & Health*, Feb. 8, 1999, US.
Gary Chodes, "High Net Worth Viaticals Ripe for Reinsurers", *National Underwriter—Life & Health*, Apr. 26, 1999, US.
Jeff Benjamin, "Investing in Death Gets a New Life", *Investment News*, vol. 5, No. 8, Feb. 26, 2001, US.
Scott Harrison,"Life-policy Firms Secure Financing", *Asset-Backed Alert*, Aug. 20, 2001, US.
"Issuer's Plan Rekindles Death-bond Debate", *Asset-Backed Alert*, Mar. 29, 2002, US.
Ron Panko, "Cashing Out:", *Best's Review*, vol. 102, Issue 12, Apr. 1, 2002, US.
Amy Holmwood and Louis Krisberg, "The Capital Mazimization Strategy" *Primeda, Intertec* Feb. 2000 US.

* cited by examiner

*Primary Examiner*—Charles R Kyle
*Assistant Examiner*—Robert R Niquette
(74) *Attorney, Agent, or Firm*—Mark Nowotarski

(57) ABSTRACT

Survival risk insurance is a method of transferring the financial consequences associated with the risk that deaths occurring within a specified period of time in a selected group of insured lives will be less in number than the expected number of deaths or less in amount than the expected amount of death benefits paid. More particularly, one entity, the Coverage Recipient, can transfer a financial risk that the actual number of deaths or the actual amount of death benefits paid during a specified period relative to a selected group of insured lives will be less than the expected deaths or the expected amount of death benefits paid to another entity, the Coverage Provider, for the payment of an appropriate premium based on the method of this invention.

29 Claims, No Drawings

SURVIVAL RISK INSURANCE

CROSS-REFERENCE TO RELATED APPLICATION

This application is a division of and claims the benefit of the filing date of U.S. nonprovisional application entitled "Method of Calculating Premium Payment to Cover the Risk Attributable to Insureds Surviving a Specified Period", Ser. No. 10/743,201 filed Dec. 22, 2003, now U.S. Pat. No. 6,999,935, which is incorporated herein by reference.

Said U.S. nonprovisional application entitled "Method of Calculating Premium Payment to Cover the Risk Attributable to Insureds Surviving a Specified Period", in turn claims the benefit of the filing date of U.S. provisional patent application entitled "Method of Calculating Premium Payment to Cover the Risk Attributable to Insureds Surviving a Specified Period", Ser. No. 60/507,170, filed Sep. 30, 2003. Said provisional application is incorporated herein by reference.

FIELD OF INVENTION

The invention relates to the field of financial products and methods involving the provision of death benefits through life insurance. As used in this invention, the expression "life insurance" relates to the type of insurance policy that provides a death benefit if the life or lives insured by the policy die while the insurance policy is in force or effect.

BACKGROUND OF THE INVENTION

Life insurance companies, through the issuance of life insurance policies, accept a transfer of the risk of adverse financial consequences which would be created when an insured life dies. Typically, the death of an individual creates adverse financial consequences for those who depend on future income or work contributions lost as a result of the individual's death. A life insurance policy is typically purchased to provide a beneficiary with a death benefit payment. The purpose of the death benefit payment is to provide the beneficiary with the means to offset, at least in part, the financial strain created by the unexpected or untimely early death of the insured.

Life insurance pricing (that is, the determination of the premium charged by the insurance company for the acceptance of a stated death benefit risk) is based on a number of factors for which assumptions are made including: mortality, interest, expenses (including taxes), and policy persistency. Policy persistency is the probability that the owner of a life insurance policy will choose to keep the policy in force by paying the premiums required as per the terms of the insurance contract. A policyholder who does not persist is said to have lapsed. An assumption with respect to lapse rates is typically the way persistency is incorporated into pricing calculations. Pricing assumptions are made prior to the issuance of a life insurance policy and are made relative to an entire class of insured lives and not with respect to individual insureds.

A number of different sets of pricing assumptions may be used. Assumption sets may vary by mortality class, type of distribution used, or by other characteristics commonly used to distinguish between classes of insured lives in the insurance industry. For example, different mortality assumptions may be applied to males versus females or to non-smokers versus smokers. Those skilled in the art are well aware of the fact that many other mortality class distinctions exist or are possible.

Also, different expense assumptions may be applied in different marketing situations. For example, insurance offered directly to the consumer in a direct marketing distribution channel versus insurance offered through a traditional agent based distribution channel will have different expense assumptions applied to reflect the different expected costs in these different marketing channels.

The interest rate assumptions used in pricing are important because they provide an adjustment for the timing differences between when cash goes into and out of the pricing calculations.

Persistency or lapse assumptions affect pricing calculations by creating an expectation with respect to the occurrence of cash flows which are dependent on the insurance policy being in force or effect.

When an individual insured applies for life insurance, an underwriting process is applied. The underwriting process determines, the appropriate premium or underwriting class for the applicant based on an evaluation of the applicant's mortality characteristics and life expectancy. This is based in part on expertise the underwriter derived from prior training or experience. Life expectancy is the average number of years individuals in the same underwriting class can be expected to live. Maximum life expectancy is the highest age to which an individual in the underwriting class can be expected to live.

A life insurance policy may provide for some change in assumptions after the policy is issued. Such changes would modify the current charges or credits provided for in the policy for a class of insureds. These changes would result in a change in the overall cost of the life insurance for each insured in the same class of insureds. Such changes can only be justified by changes in experience after issue for the whole class to which an insured belongs and can only be applied to all insurance policies in the class. Typically the range of change allowed in a life insurance policy is limited by minimum or maximum guarantees made in the life insurance contract or policy relative to each assumption that may be changed.

One type of life insurance policy contains an endowment feature. This type of life insurance policy is called an endowment policy. With respect to such life insurance, the insurance company would pay an amount called the endowment benefit to the insured on the endowment date, for example age 65, if the insured survived to that date. Because of changes in the way life insurance is taxed by the US federal government, endowment policies of this sort are, typically, no longer offered as there are adverse tax consequences associated with life insurance policies that endow prior to age 95.

The assumptions used in pricing a life insurance policy include an assumption regarding the maximum life expectancy of the lives insured. For many currently issued life insurance policies, this maximum life expectancy has been assumed to be age 100. More recent mortality tables used for life insurance pricing purposes are beginning to recognize longer maximum life expectancies, for example, age 120. These longer maximum life expectancies are made possible by improvements in health care and a general improvement in the health of the insured life population. Mortality tables developed for purposes other than life insurance pricing may have found it convenient to make assumptions regarding the maximum life expectancy different from age 100. For example, annuity products may use mortality tables for pricing purposes with a maximum life expectancy greater than age 100.

This maximum life expectancy age is often referred to as the maturity age for the life insurance policy. Any insured who survives to the end of this period can be thought of as reaching the ultimate endowment age. Typically, life insurance companies will make the death benefit of the life insurance policy available in some way to insureds who survive to the maturity age. One alternative is to pay an amount equal to the death benefit at the maturity age directly to the insured as an endowment benefit on the maturity date. Another alternative is for the insurance company to hold such a maturity age endowment benefit in an interest bearing account until such time as the insured actually dies. Then the benefit is paid as a death benefit. This later alternative is used to potentially avoid the possible adverse tax consequences associated with paying the death benefit to the insured before the insured actually died.

In the past, the value in a life insurance policy was determined only by the contractual terms of the life insurance policy and confined to the relationship the owner of the policy had with the insurance company providing it. Recently, however, secondary markets for life insurance policies have developed in which a life insurance policy is purchased or the right to receive the death benefit is assigned to a third party by the owner of the policy in exchange for a fee or purchase price.

Examples of the operation of secondary markets can be seen in the life settlement market and viaticals. These markets involve life insurance policies on insured lives who become impaired after their policies were originally issued. In these markets, life insurance policies are purchased by third parties (that is, neither the owner of the policy nor the insurance company issuing the policy) or assigned to third parties for a fee or payment of some sort. For such payment the third party receives the right to receive the policy death benefit when the insured dies.

An impaired life is an insured life who develops an impairment after the life insurance policy was originally issued which reduces his or her life expectancy. An impairment is any medical condition affecting the health status of the insured life which results in a higher mortality rate for the insured life than was reflected in the original mortality assumption made for the underwriting class the insured was assigned to when the insurance policy was issued. Because of the impairment acquired after original issuance of the policy, the likelihood of an earlier than expected death claim is increased. This situation may make life insurance policies covering such impaired lives worth more than the cash surrender value provided by the contractual terms of the policies.

The cash surrender value of a life insurance policy is the amount of money the life insurance company that issued the policy is willing to pay if the policy is lapsed or surrendered. A life insurance policy is lapsed if the owner of the policy stops paying the premiums required to keep the policy in force per the terms of the life insurance contract. For a typical term life insurance policy or whole life insurance policy, the policy lapses when the owner stops paying the contractually required premiums. A whole life insurance policy may have a cash value at the time it lapses which can be surrendered and paid to the policy owner in cash or applied by the policy owner under one of the nonforfeiture options contained in the policy contract.

For a universal life or variable universal life insurance policy with a flexible premium structure, the policy lapses when the cash value of the policy becomes insufficient to cover the insurance related charges specified in the policy contract. Typically this occurs because the policy owner has not made premium payments prior to the lapse sufficient to keep the policy cash value large enough to cover said charges.

A life insurance policy can be surrendered by an owner who voluntarily agrees to terminate the life insurance protection provided by the policy in exchange for the payment of the policy's cash surrender value. A life insurance policy's cash surrender value is the cash value of the policy defined in the life insurance contract adjusted for any amounts owed by the owner to the insurance company (for example, policy loans) or any additional amounts owed by the insurance company to the owner (for example, dividends). For universal and variable universal life insurance forms of insurance there may also be specifically stated surrender charges which are deducted to determine the cash surrender value.

Life insurance benefits may also be assigned to third parties in insurance marketing programs in which life insurance is used as a funding mechanism by a benefit plan sponsor. The benefit plan sponsor is a third party which pays for or in some other fashion enables benefits related to the life or health of an individual or individuals. The benefits provided by the benefit plan sponsor consist of cash payments designed to fund health, retirement, or death needs. Funding mechanisms which utilize life insurance benefits rely either on the cash values built up within a set of life insurance policies or the life insurance policies' death benefits to meet funding requirements for a benefit plan.

Several benefit plans have been funded with the expectation of full or partial funding cost recovery via anticipated or expected death benefit proceeds from the life insurance policies. When death benefit proceeds are used to reduce or recover the cost attributable to benefit plans, it is important that the death proceeds be received in a predictable manner based on a set of mortality assumptions chosen by the benefit plan sponsor. Such chosen mortality assumptions, however, are often inaccurate due to the fact that the actual mortality experience for a selected group is difficult to determine because, generally, such data is not publicized by the insurance companies or reinsurance companies that collect the data.

Many benefit plans involving the use of life insurance policies as a funding vehicle do not take into account changes in the health status of the insured lives after the insurance policies were issued. That is, they do not rely for their value on the insured life becoming impaired. In order for life insurance policies to be an effective funding tool in programs in which death proceeds are the funding source, however, the death benefits actually received must be reasonably close to the death benefits expected based on the mortality assumptions used to set up the program.

It is well recognized that for the financial products created by the use of life insurance death proceeds as a funding vehicle, adverse financial consequences are created if the actual mortality experience of the lives insured under the life insurance policies being used is better than assumed. That is, adverse financial consequences are created for the third parties if the insured lives, as a group, live longer than expected. This can occur, for example, if a financial product is created by the purchase of a pool of life insurance policies insuring a group of insureds who have lives that are impaired at the time of purchase but who ultimately as a group live longer than expected. The investors providing the cash used to make these purchases are expecting a return on the money they have invested. The return the investors receive is derived from the death benefits that are paid on the life insurance policies that were purchased with the cash they provided. This return is expected to consist of the return of their invested principal plus an investment return. The amount of the investment return or income the investors receive is dependent on the amount and timing of the actual death benefit proceeds received from the group of policies purchased. A purchase price value is calculated for the policies being purchased which is based on mortality assumptions from which the timing and amount of expected future death proceeds can be projected. In addition, other expense and risk charge assumptions are typically made in order to determine a final purchase price for such life insurance policies.

Since it is the death proceeds of the group of policies purchased which provide the revenue to pay back the investors their principal and a return on their investment, the actual death proceeds must be reasonably close to the expected death proceeds in amount and timing for the expected investment return to be realized. In a life settlement transaction, the investors would experience adverse financial consequences if the insured lives experienced better mortality as a group than the mortality assumption used to determine the purchase price for the policies.

Another example of when a set of insureds living longer than expected would have adverse financial consequences for a third party beneficiary, would be a situation in which a benefit plan's funding was dependent on the actual death proceeds from a life insurance policy or group of life insurance policies for which the insured or insureds health was not impaired. The benefit plan sponsor anticipates receiving life insurance policy benefits in an expected manner with respect to timing and amount. Such expectation would be based on the assumed level of mortality used in establishing the benefit plan's funding. Death benefit proceeds received by the plan sponsor later than expected, in lower amounts, or not at all would result in adverse financial consequences to the benefit plan sponsor since this would result in the benefit plan being under funded.

The financial risk that a third party beneficiary faces from a set of insured lives living longer than expected is referred to herein as a "survival risk". There is a need for a method of insuring against the adverse financial consequences of survival risk.

Given the variety of benefit programs in the insurance industry which are based on the inherent tax advantages attributable to the payment of death benefit proceeds and rely on the timely payment of death benefit proceeds according to projections based on reasonable mortality assumptions, it would be desirable to have an insurance product under which the risk of survival and the adverse financial consequences of survival longer than expected could be transferred from one entity to another entity willing to accept that survival risk for a premium.

SUMMARY OF THE INVENTION

The present invention comprises a method for insuring against the adverse financial consequences of survival risk to a third party and a means for calculating the premium for said insurance. Said insurance is referred to herein as "survival risk insurance". Said third party is referred to herein as the Coverage Recipient. The party providing survival risk insurance is referred to herein as the Coverage Provider.

The method for a Coverage Provider providing survival risk insurance to a Coverage Recipient comprises the steps of:
selecting a group of insured lives such that the insured lives belong to a mortality class as of a beginning date;
calculating an expected death benefit payable to the Coverage Recipient due to expected deaths of the members of the group of insured lives, said deaths occurring between the beginning date and an end date;
committing the Coverage Provider to pay the Coverage Recipient a benefit equal to a percentage of the positive difference between the expected death benefit and an actual death benefit payable to the Coverage Recipient due to actual deaths of members of the group of insured lives, said deaths occurring between the beginning date and the end date;
committing the Coverage Recipient to pay a premium to the Coverage Provider in exchange for the benefit.

DETAILED DESCRIPTION OF THE INVENTION

Specific embodiments of the present invention are described below. These examples are not meant to be limiting.

Survival risk insurance may comprise a Coverage Provider offering to pay to a Coverage Recipient an amount equal to a percentage of the death benefit of an original life insurance policy issued to an insured by an original life insurance company at the end date of a specified period of time if the death of the insured does not occur during the specified period of time. The Coverage Provider would receive the death benefit proceeds at a later time when the death of the insured actually occurs or the original life insurance policy endows. The original life insurance policy must be kept in force by fulfilling the contractual obligation of the policy owner to the original life insurance company.

Survival risk insurance would be evidenced by a survival risk insurance policy issued by the Coverage Provider to the Coverage Recipient. The specified period would begin on the date the survival risk insurance policy was issued. This date is the beginning date.

The survival risk insurance policy premium payable by the Coverage Recipient to the Coverage Provider would be calculated using a method of premium calculation. The method may be expressed in a formula. The results of the formula may be calculated using a computer. More particularly, the results of multiple copies of the formula may be calculated using a spreadsheet.

The formula to calculate the survival risk insurance policy premium is a function of:
the probability of survival of the insured from the beginning to the end of the specified period;
the probability of the death of the insured for each year or fraction thereof after the specified period;
an interest rate representing the cost of use of money by the Coverage Provider;
a default risk attributable to the original life insurance company;
a default risk attributable to at least some entity maintaining the original life insurance policy in force after the specified period until maturity of the original life insurance policy by death or endowment;
applicable expenses, such as taxes; and
profits.

Unless otherwise defined herein, all terms and expressions used herein have their standard actuarial meaning as defined in the Society of Actuaries' Textbook on Life Contingencies (Second Edition) by Chester Wallace Jordan Jr. published by the Society of Actuaries in 1967.

Description of Assumptions Used in Calculations Herein

Probability of death or survival: The probability of death may be based on standard experience mortality tables, such as the 1990-95 Basic Select and Ultimate Mortality Table developed by the Society of Actuaries, or the mortality tables based on mortality experience and developed in-house by life insurance companies or reinsurance companies. Such mortality tables would be modified with respect to each insured life based on assumptions and methods commonly applied by those skilled in the art to reasonably reflect the survival risk of the lives in a select group of insured lives. These methods involve collecting data applicable to the current health of an insured life (including but not limited to the most recent medical reports available on the health status of the insured life) in order to determine a current mortality rating to be applied to a standard experience mortality table.

Interest Rate: This is a hurdle or interest rate set by the Coverage Provider representing the time value of money relative to the Coverage Provider's needs. The interest rate used by the Coverage Provider will reflect interest rates currently available to the Coverage Provider for other uses of the Coverage Provider's money. The time value of money reflected in an interest rate includes a charge for the risk associated with the return of principal invested or lent. Therefore, the interest rate used by the Coverage Provider will reflect these environmental factors. Typically interest rates can be in the range 4% to 25% for environmental factors within a normal range. Interest rates are annual effective interest rates unless otherwise indicated.

Default Risk Attributable to Original Life Insurance Company. This is a risk associated with the probability that the original life insurance company will ultimately pay the death benefit provided for in the policy it issued to an insured life. The level of this risk depends on the financial stability of the life insurance company, historical trends, and financial strength ratings provided by various insurance industry rating organizations (e.g. A. M. Best, Moody's, Standard & Poors). A typical range for this factor is 0% to 5% of the death benefit.

Default Risk Attributable to Coverage Recipient. This is a risk associated with the probability that the owner of the original life insurance policy on the insured life will meet its contractual obligations to keep the original policy in force beyond the expiry of the specified period. The level of this risk depends on the steps taken by the survival risk insurance policy owner to keep the original life insurance policy in force. As used herein, "owner", means the entity keeping the original life insurance policy in force. The Coverage Recipient would be the owner if they purchased the life insurance policy from the original insured. To minimize the default risk attributable to the Coverage Recipient, for example, the Coverage Recipient may purchase a Guaranteed Investment Contract (GIC) or Annuity that will guarantee the payment of premiums on the original life insurance policy beyond the expiry of the specified period. A typical range for this factor is 0% to 10% of the death benefit.

Tax Attributable to death or endowment proceeds: If a transfer of ownership of the original life insurance policy is utilized between the Coverage Recipient and the Coverage Provider, such transfer of ownership of a life insurance policy may trigger a taxable income to the Coverage Provider when the Coverage Provider ultimately receives the death benefit proceeds of the original life insurance policy. The survival of the insured to the maturity date of the original life insurance policy (attained age 100 for a policy based on the 1980 CSO Valuation Mortality Tables, for example) may trigger an endowment and result in taxable income to the Coverage Provider. The range for this factor is 0 to 1.

Means for Calculating Premium

A means for calculating the premium for a survival risk insurance policy comprises the following five steps.

Step I

For each life in a selected group of insured lives, determine the present value of a survival risk benefit payable by a Coverage Provider to a Coverage Recipient. The survival risk benefit for each life is equal to a percentage of the life insurance benefit of the insured life. The life insurance benefit is equal to the death benefit or endowment benefit, depending upon whether or not the insured lives to the endowment age specified in the life insurance policy. The survival risk benefit is discounted from the end date to the beginning date using an interest rate and assumed mortality. The discounted survival risk benefit is defined as the present value of the survival risk benefit. The present value of step I is referred to herein as "PV1". It is also referred to herein as "the present value of the Coverage Provider cost".

Step II

For each life in the selected group of insured lives, determine the present value as of the end date of the expected life insurance benefit for each life, assuming the life survives past the end date. The life insurance benefit is discounted to the end date using the probability that the insured with die, or the life insurance policy will endow, on a given date and the interest rate. The present value may be adjusted by tax factors. The present value of step II is referred to herein as PV2.

Step III

For each life in the selected group of insured lives, determine the present value of PV2 as of the beginning date. PV2 is discounted using the interest rate and the expected probability that the life will survive to the end date. The present value of step III is referred to herein as PV3. It is also referred to herein as "the present value of the Coverage Provider reimbursement".

Step IV

For each life in a selected group of insured lives, calculate a single premium for the survival risk insurance policy. The single premium is at least equal to PV1 minus PV3. The single premium may also include factors attributable to the expense and profit of the Coverage Provider, the default risk attributable to the insurance company which issued the original of life insurance policy; and the default risk attributable to the Coverage Recipient, other expenses and profits for the Coverage Provider.

Alternatively, for each life in a selected group of insured lives, calculate an annual premium for the survival risk insurance policy. The annual premium would be paid over a premium paying period. The annual premium is equal to the single premium divided by a life annuity due factor. The life annuity due factor is the present value of $1.00 payable at the beginning of each year of the premium paying period. It is calculated based on an assumption of the probability of the insured life's survival during the premium paying period. It also is based on an interest rate set by the Coverage Provider. Methods to calculate a life annuity due factor based on mortality and interest assumptions are well known to life insurance actuaries skilled in the art.

Step V

The single premiums or annual premiums for each insured life are summed to give a total single premium or total annual premium for the survival risk insurance policy.

The following describes formulas used to calculate the premium as per above Steps I-V.

Definition of Terms Used in the Formulas:

x=The age of an insured life m at the beginning date. "m" is the number of an insured life in a selected group of insured lives. The term "insured" means "insured life" unless otherwise indicated.

$q_{x+j}$=Probability of death of the insured m between the beginning of year j and the end of year j. j is a number of years after the beginning date.

$p_{x+j}$=Probability of survival of the m from the beginning of year j to the end of year j.

i=annual effective interest rate representing the cost of use of money of the Coverage Provider.

PV1=The amount determined in step I

PV2=The amount determined in step II

PV3=The amount determined in step III $DB^m$=The death benefit receivable by a beneficiary on the death of insured m.

F=The default risk attributable to the insurance company issuing the original life insurance policy on insured m. F is a percentage of the death benefit of insured m.

G=The default risk attributable to the Coverage Recipient. G is a percentage of the death benefit of insured m.

$SPR^m$=Single premium chargeable by the Coverage Provider with respect to a survival risk insurance policy on insured m.

SPR=Total single premium chargeable by the Coverage Provider for all survival risk insurance policies on insured lives m in the selected group.

s=The premium paying period for survival risk insurance policy.

$APR_s^m$=Annual premium chargeable by the Coverage Provider for s years with respect to a survival risk insurance policy on insured m.

$APR_s$=Total annual premium chargeable by the Coverage Provider for s years for all survival risk insurance policies on insured lives m in the selected group.

T1=An adjustment factor to reflect any tax attributable to death benefit receivable by the Coverage Provider.

T2=An adjustment factor to reflect tax attributable to any endowment receivable by the Coverage Provider.

N=Length of the specified period in years.

$ä_{x:\overline{s}|}$=a life annuity due of $1.00 payable at the beginning of each year of a premium paying period.

E=Expense factor set by the Coverage Provider. E is expressed as a percentage of the death benefit.

H=Factor for desired profit set by the Coverage Provider. H is expressed as a percentage of the death benefit.

Y=A percentage applied to the death benefit proceeds.

ω=the maturity age of the life insurance policy of insured m.

The following equations define certain parameters.

$$p_{x+j} = 1 - q_{x+j}$$

$$v = \frac{1}{1+i}$$

$$_t p_x = p_x \cdot p_{x+1} \cdot \ldots \cdot p_{x+t-1}$$

The following equations are used to calcuate the single premium or annual premium of a survival risk insurance policy.

$$PV1 = \frac{Y}{100} \cdot DB^m \cdot {}_N p_x \cdot v^N$$

$$PV2 = \left\{ \left[ \sum_{k=N}^{\omega-x-1} v^{k+1-N} \cdot {}_{k-N} p_{x+N} \cdot q_{x+k} \cdot T1 + {}_{\omega-x-N} p_{x+N} \cdot v^{\omega-x-N} \cdot T2 \right] \cdot \frac{i}{\ln(1+i)} \right\} \cdot DB^m$$

$$PV3 = {}_N p_x \cdot v^N \cdot PV2$$

$$SPR = \sum_{All\,Policies} SPR^m$$

$$SPR^m = (PV1 - PV3) + \frac{F+G}{100} \cdot DB^m + \frac{E+H}{100} \cdot \frac{Y}{100} \cdot DB^m$$

$$APR_s^m = \frac{SPR^m}{ä_{x:\overline{s}|}}$$

$$APR_s = \sum_{All\,Policies} APR^m$$

The factors E, F, G, and H may be set by the Coverage Provider. The factors may have values commonly used in the life insurance industry or may be calculated using means commonly employed in the life insurance industry.

Variations

A survival risk insurance policy may be modified in a number of ways. The following describes some of these variations. Other variations may be apparent to one skilled in the art.

Variation 1

The Coverage Provider may agree to absorb additional risk by agreeing to pay the death benefit of the original life insurance policies at the end of the specified period irrespective to whether deaths occur during the specified period or after the specified period. The Coverage Provider would then collect the death benefits from the original life insurance policies regardless of when the insureds' deaths occur.

The following formulas would be used to calculate PV1 and PV3.

$$PV1 = v^N \cdot \frac{Y}{100} \cdot DB^m$$

$$PV3 = \left[ \sum_{k=0}^{\omega-x-1} v^{k+1} \cdot {}_k p_x \cdot q_{x+k} \cdot T1 + {}_{\omega-x} p_x \cdot v^{\omega-x} \cdot T2 \right] \cdot \frac{i}{\ln(1+i)} \cdot DB^m$$

Variation 2

The Coverage Provider may agree to pay a schedule of periodic payments during the specified period and collect the death benefits from original life insurance policies regardless of when the insured's deaths occur. The Coverage Provider would receive the actual death benefit proceeds for deaths occurring both during and after the specified period. For example, the schedule of periodic payments may be equal to the expected incremental death benefits calculated by using the Coverage Recipient's assumed mortality rates.

PV1 would be calculated as the present value of such schedule of payments using standard actuarial methods.

Variation 3

The Coverage Provider may undertake the responsibility to maintain a positive cash value in the original life insurance policies in order to keep the original policies in force. The survival risk insurance policy premium would be increased to cover such additional cost. The increase will be an amount such that, together with the existing cash value of the original life insurance policy at the time of purchase of the survival risk insurance policy and taking into account the current and guaranteed expense and cost of insurance assumptions of the original life insurance policy, it will be sufficient, if paid as a premium, to keep the original policies in force. All assumptions used will be those considered actuarially appropriate for this purpose by the Coverage Provider. This variation may result in a lower cost being associated with the Default Risk Attributable to Coverage Recipient. Standard actuarial methods would be used to adjust the given formulas.

Variation 4

The Coverage Provider may undertake to periodically redetermine the mortality rate assumption based on the actual experience of specific populations of insureds covered by survival risk insurance policies. As a result, the Coverage Provider may reserve the right to modify its premium depending on actual experience.

The Coverage Provider would recalculate the premium based on the redetermined mortality rate assumption. The premium may be increased or decreased.

Variation 5

The Coverage Provider may offer to pay an amount equal to a percentage of the death benefit of an original life insurance policy as a loan at the end of a specified period if the death of the insured does not occur during the specified period. The Coverage Provider will receive loan interest from the Coverage Recipient in addition to the premium for the survival risk policy. The Coverage Recipient will repay the loan upon receiving the death benefit when the insured life actually dies.

This variation may allow T1 and T2 to be set equal to 1.0. That is, no tax adjustment would be necessary.

Alternatively, loan interest may be taken into account in calculating the premium payable to the Coverage Provider by the Coverage Recipient so that the Coverage Recipient does not have to pay loan interest as a separate payment. In such situations PV1 will be increased by an amount called $LSPR^m$. $LSPR^m$ is defined as follows:

$$LSPR^m = {}_N p_x \cdot v^N \cdot \sum_{t=N}^{\omega-x-1} v^{t+1-N} \cdot {}_{t-N}p_{x+N} \cdot q_{x+t} \cdot L_{t+1-N}$$

where $L_k$ is the loan interest payable in year k after the end of the specified period.

$L_k$ may include partially accrued loan interest in the year of the insured life's actual death. This depends on when in the year of death the principal and the accrued loan interest is paid to the Coverage Provider.

The default risk attributable to the Coverage Recipient may be adjusted to reflect a change in default risk under this variation.

NUMERICAL EXAMPLES

Example 1

A premium is calculated for a survival risk insurance policy on a single insured life. The insured life under an original life insurance policy is a male nonsmoker who is age 70 at a beginning date. The mortality rate assumed by the Coverage Provider for the insured life is 900% of the 1990-95 Basic Select and Ultimate Mortality Table developed by the Society of Actuaries.

$\omega$ equals age 100. T1 is set equal to 0.80. T2 is set equal to 0.65. F is set equal to 1%. G is set equal to 2%. E is set equal to 1%. H is set equal to 2%. The interest rate is set equal to 8%. The percentage Y is set equal to 100%. $DB^m$ equals $1,000,000. The specified period is 10 years. Annual premiums for the survival risk insurance policy are to be paid for 3 years.

Step I: Calculate the value of PV1 defined by the formula:

$$PV1 = \frac{Y}{100} \cdot DB^m \cdot {}_{10}p_{70} \cdot v^{10}$$

Using standard actuarial methods given the mortality and interest rate assumptions, ${}_{10}p_{70}=0.11827$ and $v^{10}=0.46319$ (when i=8%). Therefore, the value of PV1=$1,000,000*0.11827*0.46319=$54,781.48.

Step II: Calculate the value of PV2 defined by the formula:

$$PV2 = \left\{ \left[ \sum_{k=10}^{100-x-1} v^{k+1-10} \cdot {}_{k-10}p_{80} \cdot q_{70+k} \cdot T1 + {}_{20}p_{80} \cdot v^{20} \cdot T2 \right] \cdot \frac{i}{\ln(1+i)} \right\} \cdot DB^m$$

The following table shows the individual factors in the summation expression in the formula above and the total for the summation. In calculating the individual terms in the summation, T1 is equal to 0.80 per the previously stated assumptions. $v=1/(1.08)=0.92593$ was used to calculate the $v^{t+1}$ term.

TABLE 1

| Attained Age | k | t | 1990-95 Basic S&U Mortality Rates | $q_{80+t}$ (=9 times 1990-95 Mortality Rate) | $_tp_{80}$ | $_tp_{80} * q_{70+k}$ | $v^{t+1} * {}_tp_{80} * q_{70+k} * T1$ | Sum of Previous Column |
|---|---|---|---|---|---|---|---|---|
| 80 | 10 | 0 | 0.04008 | 0.36072 | 1.00000 | 0.36072 | 0.26720 | |
| 81 | 11 | 1 | 0.05076 | 0.45684 | 0.63928 | 0.29205 | 0.20031 | |
| 82 | 12 | 2 | 0.06112 | 0.55008 | 0.34723 | 0.19100 | 0.12130 | |
| 83 | 13 | 3 | 0.07906 | 0.71154 | 0.15623 | 0.11116 | 0.06537 | |
| 84 | 14 | 4 | 0.09117 | 0.82053 | 0.04506 | 0.03697 | 0.02013 | |
| 85 | 15 | 5 | 0.10214 | 0.91926 | 0.00809 | 0.00744 | 0.00375 | |
| 86 | 16 | 6 | 0.11477 | 1.00000 | 0.00065 | 0.00065 | 0.00030 | |
| 87 | 17 | 7 | N/A | N/A | 0 | 0 | 0 | |
| 88 | 18 | 8 | N/A | N/A | 0 | 0 | 0 | |
| 89 | 19 | 9 | N/A | N/A | 0 | 0 | 0 | |
| 90 | 20 | 10 | N/A | N/A | 0 | 0 | 0 | |
| 91 | 21 | 11 | N/A | N/A | 0 | 0 | 0 | |
| 92 | 22 | 12 | N/A | N/A | 0 | 0 | 0 | |
| 93 | 23 | 13 | N/A | N/A | 0 | 0 | 0 | |
| 94 | 24 | 14 | N/A | N/A | 0 | 0 | 0 | |

TABLE 1-continued

| Attained Age | k | t | 1990-95 Basic S&U Mortality Rates | $q_{80+t}$ (=9 times 1990-95 Mortality Rate) | $_tp_{80}$ | $_tp_{80} * q_{70+k}$ | $v^{t+1} * _tp_{80} * q_{70+k} * T1$ | Sum of Previous Column |
|---|---|---|---|---|---|---|---|---|
| 95 | 25 | 15 | N/A | N/A | 0 | 0 | 0 | |
| 96 | 26 | 16 | N/A | N/A | 0 | 0 | 0 | |
| 97 | 27 | 17 | N/A | N/A | 0 | 0 | 0 | |
| 98 | 28 | 18 | N/A | N/A | 0 | 0 | 0 | |
| 99 | 29 | 16 | N/A | N/A | 0 | 0 | 0 | |
| 100 | 30 | 20 | N/A | N/A | 0 | 0 | 0 | 0.67836 |

For i=8% the value of the expression i/ln(1+i) is 1.039487. Since $_{20}p_{80}=0$, the T2 expression in the formula is equal to 0.

Therefore, the value of PV2=(0.67836+0)*1.039487*$1,000,000=$705,146.40.

Step III: Calculate the value of PV3 defined by the formula:

$$PV3 = {_{10}p_{70}} \cdot v^{10} \cdot PV2$$

Using previously given values, PV3=0.11827*0.46319*$705.146.40=$38,628.96.

Step IV: Calculate the single premium, $SPR^m$, for the survival risk insurance associated with this insured life's life insurance policy, m, using the formula:

$$SPR^m = (PV1 - PV3) + \frac{F+G}{100} \cdot DB^m + \frac{E+H}{100} \cdot \frac{Y}{100} \cdot DB^m$$

and the annual premium payable for three years, $APR_3^m$, for the survival risk insurance associated with this insured life using the formula:

$$APR_3^m = \frac{SPR^m}{\ddot{a}_{70:\overline{3}|}}$$

Substituting the given assumptions and the previously calculated values, $SPR^m$=($54,781.48−$38,628.96)+30,000+30,000=$76,152.52. This is approximately, 7.6% of the death benefit.

Then, given that $\ddot{a}_{70:\overline{3}|}$=2.61950 $APR_3^m$=$29,071.40. This can be expressed approximately as 2.9% of the death benefit.

Step V: Calculate the total premium for the survival risk insurance policy by summing the individual policy calculations using the formulas:

$$SPR = \sum_{All\ Policies} SPR^m$$

$$APR_s = \sum_{All\ Policies} APR^m$$

If there were 10 identical individual life insurance policies in the selected group of policies then SPR=$761,525 and $APR_3$=$290,714, rounded to whole dollars.

Example 2

Calculate the premium for Variation 1 using the data from Example 1, unless otherwise indicated.

Variation 1, as described above, involves the Coverage Provider agreeing to pay the death benefits for the life insurance policies in the selected group of policies at the end of the specified period and receive all death proceeds irrespective of whether the deaths occur during or after the specified period. This involves using the following formulas in place of the formulas previously given to calculate PV1 and PV3 (the term PV2 is not required for this variation):

$$PV1 = v^{10} \cdot \frac{Y}{100} \cdot DB^m$$

$$PV3 = \left\{ \left[ \sum_{k=0}^{100-70-1} v^{k+1} \cdot {_kp_{70}} \cdot q_{70+k} \cdot T1 + {_{100-70}p_{70}} \cdot v^{100-70} \cdot T2 \right] \cdot \frac{i}{\ln(1+i)} \right\} \cdot DB^m$$

PV1 can be calculated to be equal to: $463,193.49.

The following table shows the individual factors in the PV3 formula summation expression and the total for the summation.

TABLE 2

| Attained Age | k | t | 1990-95 Basic S&U Mortality Rates | $q_{70+t}$ (=9 times 1990-95 Mortality Rate) | $_tp_{70}$ | $_tp_{70} * q_{70+t}$ | $v^{t+1} * _tp_{70} * q_{70+t} * T1$ | Sum of Previous Column |
|---|---|---|---|---|---|---|---|---|
| 70 | 0 | 0 | 0.00594 | 0.05346 | 1.00000 | 0.05346 | 0.03960 | |
| 71 | 1 | 1 | 0.00937 | 0.08433 | 0.94654 | 0.07982 | 0.05475 | |
| 72 | 2 | 2 | 0.01285 | 0.11565 | 0.86672 | 0.10024 | 0.06366 | |
| 73 | 3 | 3 | 0.01628 | 0.14652 | 0.76648 | 0.11230 | 0.06604 | |
| 74 | 4 | 4 | 0.01918 | 0.17262 | 0.65418 | 0.11292 | 0.06148 | |
| 75 | 5 | 5 | 0.02217 | 0.19953 | 0.54125 | 0.10800 | 0.05444 | |
| 76 | 6 | 6 | 0.02571 | 0.23139 | 0.43326 | 0.10025 | 0.04680 | |

TABLE 2-continued

| Attained Age | k | t | 1990-95 Basic S&U Mortality Rates | $q_{70+t}$ (=9 times 1990-95 Mortality Rate) | $_tp_{70}$ | $_tp_{70} * q_{70+t}$ | $v^{t+1} * {_tp_{70}} * q_{70+t} * T1$ | Sum of Previous Column |
|---|---|---|---|---|---|---|---|---|
| 77 | 7  | 7  | 0.02944 | 0.26496 | 0.33301 | 0.08823 | 0.03814 | |
| 78 | 8  | 8  | 0.03230 | 0.29070 | 0.24477 | 0.07116 | 0.02848 | |
| 79 | 9  | 9  | 0.03542 | 0.31878 | 0.17362 | 0.05535 | 0.02051 | |
| 80 | 10 | 10 | 0.04008 | 0.36072 | 0.11827 | 0.04266 | 0.01464 | |
| 81 | 11 | 11 | 0.05076 | 0.45684 | 0.07561 | 0.03454 | 0.01097 | |
| 82 | 12 | 12 | 0.06112 | 0.55008 | 0.04107 | 0.02259 | 0.00665 | |
| 83 | 13 | 13 | 0.07906 | 0.71154 | 0.01848 | 0.01315 | 0.00358 | |
| 84 | 14 | 14 | 0.09117 | 0.82053 | 0.00533 | 0.00437 | 0.00110 | |
| 85 | 15 | 15 | 0.10214 | 0.91926 | 0.00096 | 0.00088 | 0.00021 | |
| 86 | 16 | 16 | 0.11477 | 1.00000 | 0.00008 | 0 | 0.00002 | |
| 87 | 17 | 17 | N/A | N/A | 0 | 0 | 0 | 0.51107 |

As previously, for i=8% the value of the expression i/ln(1+i) is 1.039487. And, since $_{30}p_{70}$=0, the T2 expression in the formula is equal to 0.

Therefore, the value of PV3=(0.51107+0)*1.039487*$1,000,000=$531,250.62. Therefore, SPR$^m$=−$8,057.13. A negative value for SPR$^M$ means the death benefits the Coverage Provider would receive under this variation are worth more than the benefit that would be provided by a survival risk insurance policy. Therefore, a Coverage Recipient would conclude that this is an inappropriate variation to apply Example 3

Calculate the premium for Variation 2 using the data from Example 1, unless otherwise indicated.

Variation 2, as described above, assumes a schedule of payments equal to $100,000 will be paid by Coverage Provider to the Coverage Recipient at the end of each year of the specified period. Using standard actuarial methods to determine the value of this schedule of benefits under interest only discounting yields a value for PV1=$671,008.14. Thus under variation 2, substituting this value of PV1 for the originally calculated value and using the value for PV3 calculated under variation 1, SPR$^m$=$199,757.52 and APR$_3{}^m$=$76,257.88.

Example 4

Calculate the premium for Variation 3 using the data from Example 1, unless otherwise indicated.

Variation 3, as described above, assumes that the Coverage Provider would allocate $40,000 to fulfill the premium payment obligation to maintain the original life insurance policy in force. This $40,000 allocation would increase the value of PV1 by $40,000 but the Coverage Recipient default risk would be reduced to zero and the term G, therefore, which had been 2% would be set equal to 0. Therefore, the value of SPR$^m$ would change from the original calculation by a total of 40,000−20,000 or 20,000 and, under variation 3, SPR=$96,153.61 and APR$_3$=$36,706.86.

Example 5

Calculate the premium for Variation 4 using the data from Example 1, unless otherwise indicated.

Variation 4, as described above, allows the Coverage Provider to periodically redetermine the mortality rate it uses to calculate the survival risk cost based on its actual experience. We can assume that the Coverage Provider determines at the end of the first year of coverage provided under the survival risk insurance policy that actual experience is better than originally assumed. The Coverage Provider determines, for example, that mortality is only 80% of the originally assumed mortality at the time of execution of the agreement between Coverage Provider and Coverage Recipient. Recalculating based on this reduced mortality assumption produces a higher value for SPR$^m$ and APR$_3{}^m$. Therefore, the Coverage Provider would charge an additional premium.

The following table provides values necessary to recompute the Coverage Provider charge.

TABLE 3

| Attained Age | k | t | 1990-95 Basic S&U Mortality Rates | $q_{80+t}$ (=.8 × 9 times 1990-95 Mortality Rate) | $_tp_{80}$ | $_tp_{80} * q_{70+K}$ | $v^{t+1} * {_tp_{80}} * q_{70+K} * T1$ | Sum of Previous Column |
|---|---|---|---|---|---|---|---|---|
| 80 | 10 | 0 | 0.04008 | 0.28858 | 1.00000 | 0.28858 | 0.21376 | |
| 81 | 11 | 1 | 0.05076 | 0.36547 | 0.71142 | 0.26000 | 0.17833 | |
| 82 | 12 | 2 | 0.06112 | 0.44006 | 0.45142 | 0.19865 | 0.12616 | |
| 83 | 13 | 3 | 0.07906 | 0.56923 | 0.25277 | 0.14388 | 0.08461 | |
| 84 | 14 | 4 | 0.09117 | 0.65642 | 0.10888 | 0.07147 | 0.03891 | |
| 85 | 15 | 5 | 0.10214 | 0.73541 | 0.03741 | 0.02751 | 0.01387 | |
| 86 | 16 | 6 | 0.11477 | 0.82634 | 0.00990 | 0.00818 | 0.00382 | |
| 87 | 17 | 7 | 0.12707 | 0.91490 | 0.00172 | 0.00157 | 0.00068 | |
| 88 | 18 | 8 | 0.13936 | 1.00000 | 0.00000 | 0.00015 | 0.00006 | |
| 89 | 19 | 9 | N/A | N/A | N/A | N/A | N/A | 0.66020 |

$_{10}p_{70}$=0.19017 under these revised mortality assumptions and $v^{10}$=0.46319 (when i=8%).

Therefore, the revised value of PV1=0.19017*0.46319*$1,000,000=$88,084.84. The revised value of PV2=(0.66020+0)*1.039487*$1,000,000=$686,269.32 Using previously given values, the revised value of PV3=0.19017*0.46319*$686,269.32=$60,449.92.

Given that under the revised mortality assumption $\ddot{a}_{70:\overline{3}|}$=2.65163

SPR$^m$=$87,634.92, APR$_3^m$=$33,049.45

Therefore, the additional single premium that should have been charged at issue=$87,634.92−$76,153.61=$11,481.31. The additional annual premium that should have been charged beginning at issue=$33,049.45−$30,811.46=$2,237.99

The Coverage Provider may charge an additional premium based on standard actuarial practice including the time value and money.

Example 6

Calculate the premium for Variation 5 using the data from Example 1, unless otherwise indicated.

Variation 5, as described above, assumes that an annual loan interest rate equal to 5.00% will be charged by the Coverage Provider. Under this variation, T1 and T2 are set equal to 1 since there is assumed to be no tax consequences associated with the death benefit amount being paid as a loan at the end of the specified period. The values of SPR$^m$ and APR$_3^m$ would be recalculated with the new values for T1 and T2. Therefore under this variation 5, PV2=$881,433.00 and PV3=$48,286.21. This produces the following values: SPR$^m$=$66,496.36 and APR$_3^m$=$25,385.13. Given a loan interest of 5%, then 5% of the $1,000,000 death benefit loaned, or $50,000 would be paid by the coverage Recipient to the Coverage Provider each year.

Alternatively, the anticipated loan interest could be included in the calculation of the survival risk insurance premium by including the term:

$$LSPR^m = {}_{10}p_{70} \cdot v^{10} \cdot \sum_{t=10}^{100-70-1} v^{t+1-10} \cdot {}_{t-10}p_{70+10} \cdot q_{70+t} \cdot L_{t+1-10}$$

in the PV1 formula as noted in the description of variation 5.

The following table shows the steps in the calculation of LSPR$^m$:

Then, since $_{10}p_{70}*v^{10}$=0.11827*0.46319=0.05478, LSPR$^m$=0.05478*92,576.71=$5,071.35.
PV1=54,781.38+5,071.35=$59,852.73

As in the first option for variation 5 above, the recalculated value for PV2=$881,433.00 using T1=1.0 and T2=1.0.

Therefore, PV3=$48,286.21 as above and SPR$^m$=$71,566.52.

Applications:

There are a number of applications of how a survival risk insurance product could be used in sales or marketing situations. These are shown for illustration and not meant to be limiting.

Application 1: Loan Maturity with Respect to Premium Financing

A life insurance policy owner may borrow from a lender to pay premiums to fulfill the contractual premium payment obligations with the life insurance company that issued the life insurance policy. The lender will receive the repayment of the loan plus loan interest at the time of the insured's death. The loan agreement will be structured so that the death benefit proceeds will be large enough to pay to the lender the outstanding loan balance including the accrued loan interest at the time of the insured's death with any remaining death benefit proceeds being paid as a lump sum to the insured's designated beneficiary.

The cash value of the life insurance policy given the payment of the above noted premium is expected, based on reasonable assumptions, to grow, after all applicable deductions, sufficiently enough to support the policy until death or maturity. However, the sufficiency of the life insurance policy cash value to keep the policy in force until death or maturity and provide a death benefit large enough to repay the loan balance plus accrued loan interest is not guaranteed. In addition, in the event that death does not occur during the maturity period of loan, the lender would have to refinance the loan. Lenders would prefer to be more secured with respect to recovering their loan plus accrued loan interest. Loans are generally associated with a fixed maturity period not a maturity period that is determined by a contingent event such as the death of an insured life.

The present invention will enable a Coverage Provider to absorb the lender's risk that insureds may survive an anticipated fixed loan maturity period or any other specified period. The lender would be the Coverage Recipient. A survival risk insurance policy would be issued by the Coverage Provider which would allow the payoff of the loan including accrued loan interest at the end of the fixed period set by the lender.

TABLE 4

| Attained Age | k | t | Accumulated Loan Balance at End of Year | $L_k$ Loan interest due at End of Year | $_tp_{80} * q_{70+t}$ | Value of LSPR$^m$ term for value of k | Summation of LSPR$^m$ |
|---|---|---|---|---|---|---|---|
| 80 | 1 | 10 | 1,050,000 | 50,000 | 0.36072 | 16,700.00 | |
| 81 | 2 | 11 | 1,102,500 | 102,500 | 0.29205 | 25,664.54 | |
| 82 | 3 | 12 | 1,157,625 | 157,625 | 0.19101 | 23,900.66 | |
| 83 | 4 | 13 | 1,215,506 | 215,506 | 0.11116 | 17,608.12 | |
| 84 | 5 | 14 | 1,276,282 | 276,282 | 0.03698 | 6,953.46 | |
| 85 | 6 | 15 | 1,340,096 | 340,096 | 0.00744 | 1,594.53 | |
| 86 | 7 | 16 | 1,407,100 | 407,100 | 0.00065 | 154.40 | |
| 87 | 8 | 17 | | | 0.00000 | 0.0 | 92,576.71 |

Such a policy would be issued for the percentage of death benefit of the life insurance policy sufficient to cover the loan plus accrued loan interest requirement. The specified period for such a policy may be less than or equal to the maturity period set by the lender.

As in the basic description of the present invention, the Coverage Provider will be entitled to receive the death benefit proceeds or a percentage of the death benefit proceeds of each life insurance policy covered by survival risk insurance in situations where the death of the insured life occurs after the end of the specified period. The Coverage Provider would price the survival risk insurance product on the assumption that it would receive, at least, a percentage of the death proceeds equal to the amount paid by the Coverage Provider to the lender at the end of the specified period plus interest at an acceptable rate from the end of the specified period until the actual death of the insured life.

In addition, the Coverage Provider may undertake the responsibility to maintain the policy in-force until maturity as described in variation 3.

The following provides numerical example of how the present invention would be applied to calculate a premium for a survival risk insurance policy used in this sales or marketing concept.

This numerical example is based on an Age 65 Male Non-smoker. The Coverage Provider assumes mortality equal to 100% of the 1990-95 Basic Select and Ultimate Mortality Table. Other variables are set as follows: $T1=1.0$, $T2=1.0$, $F=1\%$, $G=0\%$, $E=0.5\%$, $H=0.5\%$, $i=8\%$, $Y=100\%$, $DB'''=\$10,000,000$. The specified period, which is equal to the loan maturity period=20 years. An annual loan=$895,390 is required to pay the policy premium for 6 years. The loan interest rate=6.00%. The interest is not paid in cash but accrues. Therefore, the outstanding loan balance at the end of each year of the loan equals the original amount borrowed plus accrued loan interest. The loan plus accrued interest will be repaid out of the death proceeds when the insured dies. The amount of the annual premium, $895,390 payable over 6 years, is calculated under reasonable assumptions to support the insurance policy with increasing death benefit to recover loan balance plus $10,000,000.

Table 5 shows the calculation of the accrued loan balance and the death benefit required at the end of each year to repay the loan plus accrued loan interest and provide a death benefit equal to the original death benefit.

TABLE 5

| Attained Age | t | Annual Loan | Annual Loan Interest | Cumulative Loan Balance | Original Death Benefit | Total Required Death Benefit |
| --- | --- | --- | --- | --- | --- | --- |
| 65 | 1 | 895,390 | 53,723 | 949,113 | 10,000,000 | 10,949,113 |
| 66 | 2 | 895,390 | 110,670 | 1,955,174 | 10,000,000 | 11,955,174 |
| 67 | 3 | 895,390 | 171,034 | 3,021,597 | 10,000,000 | 13,021,597 |
| 68 | 4 | 895,390 | 235,019 | 4,152,007 | 10,000,000 | 14,152,007 |
| 69 | 5 | 895,390 | 302,844 | 5,350,240 | 10,000,000 | 15,350,240 |
| 70 | 6 | 895,390 | 374,738 | 6,620,368 | 10,000,000 | 16,620,368 |
| 71 | 7 | | 397,222 | 7,017,590 | 10,000,000 | 17,017,590 |
| 72 | 8 | | 421,055 | 7,438,646 | 10,000,000 | 17,438,646 |
| 73 | 9 | | 446,319 | 7,884,965 | 10,000,000 | 17,884,965 |
| 74 | 10 | | 473,098 | 8,358,062 | 10,000,000 | 18,358,062 |
| 75 | 11 | | 501,484 | 8,859,546 | 10,000,000 | 18,859,546 |
| 76 | 12 | | 531,573 | 9,391,119 | 10,000,000 | 19,391,119 |
| 77 | 13 | | 563,467 | 9,954,586 | 10,000,000 | 19,954,586 |
| 78 | 14 | | 597,275 | 10,551,861 | 10,000,000 | 20,551,861 |
| 79 | 15 | | 633,112 | 11,184,973 | 10,000,000 | 21,184,973 |
| 80 | 16 | | 671,098 | 11,856,071 | 10,000,000 | 21,856,071 |
| 81 | 17 | | 711,364 | 12,567,436 | 10,000,000 | 22,567,436 |
| 82 | 18 | | 754,046 | 13,321,482 | 10,000,000 | 23,321,482 |
| 83 | 19 | | 799,289 | 14,120,771 | 10,000,000 | 24,120,771 |
| 84 | 20 | | 847,246 | 14,968,017 | 10,000,000 | 24,968,017 |
| 85 | 21 | | 898,081 | 15,866,098 | 10,000,000 | 25,866,098 |
| 86 | 22 | | 951,966 | 16,818,064 | 10,000,000 | 26,818,064 |
| 87 | 23 | | 1,009,084 | 17,827,148 | 10,000,000 | 27,827,148 |
| 88 | 24 | | 1,069,629 | 18,896,776 | 10,000,000 | 28,896,776 |
| 89 | 25 | | 1,133,807 | 20,030,583 | 10,000,000 | 30,030,583 |
| 90 | 26 | | 1,201,835 | 21,232,418 | 10,000,000 | 31,232,418 |
| 91 | 27 | | 1,273,945 | 22,506,363 | 10,000,000 | 32,506,363 |
| 92 | 28 | | 1,350,382 | 23,856,745 | 10,000,000 | 33,856,745 |
| 93 | 29 | | 1,431,405 | 25,288,150 | 10,000,000 | 35,288,150 |
| 94 | 30 | | 1,517,289 | 26,805,439 | 10,000,000 | 36,805,439 |
| 95 | 31 | | 1,608,326 | 28,413,765 | 10,000,000 | 38,413,765 |
| 96 | 32 | | 1,704,826 | 30,118,591 | 10,000,000 | 40,118,591 |
| 97 | 33 | | 1,807,115 | 31,925,706 | 10,000,000 | 41,925,706 |
| 98 | 34 | | 1,915,542 | 33,841,249 | 10,000,000 | 43,841,249 |

Therefore $DB^m$ at the end of the 20$^{th}$ year is $24,968,017.

Given the following values, $_{20}p_{65}$=0.48884 and $v^{20}$=0.21455, PV1 can be calculated as follows: PV1=0.48884*0.21455*$24,968,017=$2,618,661.15.

Table 6 following provides additional information required to complete the calculation of the survival risk premium for this example.

Since the death benefit for the life insurance policy, $DB^m$, varies year to year, the formula for PV2 is modified for this example as follows:

$$PV2 = \left\{ \left[ \sum_{k=20}^{100-65-1} v^{k+1-20} \cdot {}_{k-20}p_{85} \cdot q_{65+k} \cdot T1 \cdot DB_k^m + {}_{15}p_{85} \cdot v^{15} \cdot T2 \right] \cdot \frac{.08}{\ln(1.08)} \right\}$$

For this example, the life insurance policy which is part of this premium financing approach has sufficient funding to only keep it in force through the end of policy year 33.

Therefore, it will lapse without value when the insured life is attained age 98. Thus, all values beyond attained age 98 are equal to zero and not a factor in this calculation.

ums payable to the life insurance company issuing the policies can be calculated to support the policies for the L year term.

In this situation the purchasing entity purchased the life insurance policies with a reasonable expectation that death benefit proceeds would be received during the period L according to a scheduled based on a mortality assumption. After a certain number of years, P, the purchasing entity (generally a corporation or trust) may determine that it would like to protect itself from the risk of death benefit proceeds being received that were less than what it originally assumed. By eliminating this risk the purchasing entity would be guaranteed an investment return provided by the death benefit proceeds on the life insurance policies it purchased and funded.

In order to provide itself with this protection the purchasing entity can purchase survival risk insurance from a Coverage Provider on each life on which it owns life insurance. The purchasing entity would be the Coverage Recipient. The specified period for such a survival risk insurance policy would be set equal to L–P. In order to achieve the desired level of protection, or survival risk transfer, the purchasing entity may only purchase a survival risk insurance policy covering a

TABLE 6

| Attained Age | k | t | 1990-95 Basic S&U Mortality Rates | $q_{65+t}$ (=100% of the 1990-95 Mortality Rate) | $_t p_{85}$ | $_t p_{85} * q_{65+k}$ | $v^{t+1} {}_t p_{85} * q_{65+k} * T1 * DB^m_k$ | Summation of Previous Column |
|---|---|---|---|---|---|---|---|---|
| 85 | 20 | 0 | 0.10287 | 0.10287 | 1.00000 | 0.10287 | 2,463,745.83 | |
| 86 | 21 | 1 | 0.11535 | 0.11535 | 0.89713 | 0.10348 | 2,379,320.19 | |
| 87 | 22 | 2 | 0.12771 | 0.12771 | 0.79365 | 0.10136 | 2,238,974.76 | |
| 88 | 23 | 3 | 0.13992 | 0.13992 | 0.69229 | 0.09687 | 2,057,415.09 | |
| 89 | 24 | 4 | 0.15184 | 0.15184 | 0.59542 | 0.09041 | 1,847,812.01 | |
| 90 | 25 | 5 | 0.16371 | 0.16371 | 0.50502 | 0.08268 | 1,627,206.52 | |
| 91 | 26 | 6 | 0.17782 | 0.17782 | 0.42234 | 0.07510 | 1,424,439.45 | |
| 92 | 27 | 7 | 0.19353 | 0.19353 | 0.34724 | 0.06720 | 1,229,225.77 | |
| 93 | 28 | 8 | 0.21345 | 0.21345 | 0.28004 | 0.05977 | 1,055,182.72 | |
| 94 | 29 | 9 | 0.23423 | 0.23423 | 0.22026 | 0.05159 | 879,548.35 | |
| 95 | 30 | 10 | 0.25253 | 0.25253 | 0.16867 | 0.04259 | 701,745.52 | |
| 96 | 31 | 11 | 0.26709 | 0.26709 | 0.12608 | 0.03367 | 536,479.47 | |
| 97 | 32 | 12 | 0.27242 | 0.27242 | 0.09240 | 0.02517 | 388,057.49 | |
| 98 | 33 | 13 | 0.28031 | 0.28031 | 0.06723 | 0.01885 | 281,290.59 | 19,110,443.77 |

Given 0.08/(ln(1.08))=1.03949, then

PV2=$19,110,443.77*1.039487=$19,865 057.86 and

PV3=0.48884*0.21455*$19,865,057.86=$2,083,459.62.

For purposes of calculating the terms involving the factors E and F the death benefit at the end of policy year 20 which is $24,968,017 is used. For purposes of calculating the terms involving the factors G and H the death benefit at the end of policy year 33 which is $43,841,249 is used.

This makes SPR$^m$=($2,618,661.15–$2,083,459.62)+$438,412.49+$249,680.17=$1,223,294.19

Application 2: Investment Returns Based on Death Benefits

A life insurance policy can be priced or funded to provide life insurance for a specified term, L. A group of such policies can be purchased by a purchasing entity on the lives of persons on whom such purchasing entity can establish an insurable interest. An entity has insurable interest in a life if that entity has a financially interest in said life not dying. Premipercentage Y (less than 100%) of each original life insurance policy's death benefit.

Such percentage Y will be determined such that the Coverage Provider can attain its desired profit while the purchasing entity or Coverage Recipient can ensure that its expected return will be guaranteed not to fall below a predetermined rate. The predetermined rate would be affected by the terms of survival risk insurance policy.

In this application the Coverage Provider will continue the premium paying obligation to the life insurance company that issued the life insurance policy on the insured life until the Coverage Provider received sufficient death proceeds to satisfy its pricing requirements.

The following provides a numerical example of how the present invention would be applied to calculate a premium for a survival risk insurance policy used in this application.

This numerical example is based on an Age 70 Male Non-smoker. The Coverage Recipient purchased 1,000 identical policies for a single premium of $546,938,000 paid to an insurance company which issued the life insurance policies. Said single premium was determined to be sufficient to keep the policies in force for 15 years under the Coverage Recipient's assumptions. The Coverage Recipient assumed mortality equal to 125% of the 1990-95 Basic Select and Ultimate Mortality Table for the 1,000 identical risks. The Coverage Provider assumed mortality equal to 100% of the 1990-95 Basic Select and Ultimate Mortality Table. Other variables are set as follows by the Coverage Provider: T1=1.0, T2=1.0, F=2%, G=0%, E=2%, H=2%, i=6%, Y=100%. The DB$^m$ for each policy equals $3,000,000.

The effective year of the contract between Coverage Provider and the Coverage Recipient is 3 (that is, after 2 policy years) and the specified period is equal to 13 which is 15–2. There is an additional annual life insurance premium required per the original life insurance policy to be paid by the Coverage Provider from policy year 16 of the life insurance policies and thereafter. The additional annual premium is $320,000. This premium is required to keep each of the life insurance policies in force after policy year 16 so that the Coverage Provider will be able to receive the death benefit proceeds when the insured lives die. The total life insurance premium in year 16 and thereafter is calculated as the product of $320,000 and the number of survivors expected in each year thereafter. This is shown in Table 7.

structured so that the Coverage Provider guarantees that death benefit proceeds from the life insurance policies purchased will at least equal the expected death benefit proceeds per the Coverage Recipient's assumptions during the 15 year specified period. As shown in the table, the Coverage Recipient's expected return prior to purchasing survival risk insurance was 11.41% (column IRR-1). With survival risk insurance the Coverage Recipient can guarantee a return of 8.88% (column IRR-2).

Application 3: Specified Threshold of Probability of Death.

A specified period, N, will be a number of years set on the basis of a threshold probability of the insured's death occurring during such N year period. For example, N may be set such that the probability of the death of the insured within the specified period is 0.75. This means that under the mortality assumption used to calculate the probability there is a 75% probability that the insured will die before the end of the specified period. This also means that there is a 25% probability that the insured will survive to the end of the specified period.

For each life insurance policy within a group of life insurance polices, a specified period N will be determined such that the probability of the death of the insured life during that specified period is equal to or nearly equal to the threshold probability of death. From such group of life insurance poli-

TABLE 7

| Year | Attained Age | Premium | Cash Value | Death Benefit Proceeds | Expected # of Survivors | IRR-1 | IRR-2 |
|---|---|---|---|---|---|---|---|
| 0 |    | 546,938,000 | 0 | 0 | 1000 |   |   |
| 1 | 70 |   | 549,168,282 | 22,275,000 | 991 |   |   |
| 2 | 71 |   | 560,443,486 | 34,876,604 | 976 |   |   |
| 3 | 72 |   | 563,972,423 | 47,269,502 | 957 |   |   |
| 4 | 73 |   | 559,557,017 | 58,925,030 | 932 |   |   |
| 5 | 74 |   | 547,583,509 | 68,008,776 | 904 |   |   |
| 6 | 75 |   | 528,000,273 | 76,726,077 | 873 |   |   |
| 7 | 76 |   | 500,418,632 | 86,511,547 | 838 |   |   |
| 8 | 77 |   | 464,957,553 | 95,878,995 | 799 |   |   |
| 9 | 78 |   | 422,492,633 | 101,322,212 | 759 |   |   |
| 10 | 79 |   | 372,884,420 | 106,623,332 | 717 |   |   |
| 11 | 80 |   | 315,201,008 | 115,309,304 | 672 |   |   |
| 12 | 81 |   | 246,319,765 | 138,719,061 | 619 |   |   |
| 13 | 82 |   | 168,778,185 | 156,433,168 | 560 |   |   |
| 14 | 83 |   | 84,458,069 | 186,890,071 | 491 |   |   |
| 15 | 84 |   | 64,788 | 194,218,462 | 421 | 11.41% | 8.88% |
| 16 | 85 | 134,720,000 | 46,514,758 | 192,790,892 | 354 |   |   |
| 17 | 86 | 113,280,000 | 74,218,115 | 188,971,956 | 290 |   |   |
| 18 | 87 | 92,800,000 | 86,273,649 | 179,208,411 | 233 |   |   |
| 19 | 88 | 74,560,000 | 86,396,754 | 165,323,046 | 182 |   |   |
| 20 | 89 | 58,240,000 | 78,494,058 | 148,152,196 | 139 |   |   |
| 21 | 90 | 44,480,000 | 66,337,413 | 129,671,426 | 103 |   |   |
| 22 | 91 | 32,960,000 | 52,912,484 | 112,220,143 | 75 |   |   |
| 23 | 92 | 24,000,000 | 39,793,682 | 95,136,433 | 52 |   |   |
| 24 | 93 | 16,640,000 | 27,939,075 | 79,575,398 | 35 |   |   |
| 25 | 94 | 11,200,000 | 18,179,087 | 64,109,616 | 22 |   |   |
| 26 | 95 | 7,040,000 | 10,929,361 | 48,881,392 | 13 |   |   |
| 27 | 96 | 4,160,000 | 6,015,739 | 35,380,059 | 0 |   |   |
| 28 | 97 | 0 | 2,970,387 | 24,038,303 | 0 |   |   |
| 29 | 98 | 0 | 1,101,914 | 16,311,794 | 0 |   |   |
| 30 | 99 | 0 | 124,670 | 10,950,174 | 0 |   |   |

Using the methods of the present invention in a computer implemented calculation, a value for SPR=$140,868,855 is determined. This is the payment made by the Coverage Recipient to the Coverage Provider at the beginning of policy year 3 (that is, the end of policy year 2) to purchase survival risk insurance for the life insurance policies purchased by the Coverage Recipient. This survival risk insurance would be cies, those life insurance policies with the same specified period, N, will be selected. There can be 2 or more selected groups each having the desired threshold probability of death relative to different specified periods, N. Mortality assumptions deemed appropriate for the lives being analyzed by the entity creating such selected groups (selecting entity) will be used.

To eliminate, reduce, or manage the survival risk associated with any such selected group, the selecting entity may purchase survival risk insurance from a Coverage Provider. The selecting entity is the Coverage Recipient.

The survival risk insurance policy purchased by the Coverage Recipient will pay amounts equal to the death benefits of the survivors of the specified period, N, with respect to a selected group per the present invention. The Coverage Provider will charge a premium to the Coverage Recipient for the survival risk insurance.

The Coverage Provider will make its own mortality and other assumptions in calculating the survival risk insurance premium. In particular, the mortality rate assumptions used by the Coverage provider may not be the same as the same mortality rate assumptions used by the Coverage Recipient or any other entity.

The following provides a numerical example of how the present invention would be applied to calculate a premium for a survival risk insurance policy used in this sales or marketing concept.

For a male, age 70, nonsmoker, a Coverage Provider assumes mortality rates equal to 900% of 1990-95 Basic Select and Ultimate Mortality Table. Values for the other factors required for the present invention are: $T1=1.0$, $T2=1.0$, $F=1\%$, $G=2\%$, $E=1\%$, $H=2\%$, $i=8\%$, $Y=100\%$, and $DB^m=\$1,000,000$. The Coverage Provider decides to use a threshold probability of 0.9999. Therefore, the specified period N will equal the period N for which the probability the insured will die during the period is 0.9999. The insured's probability of survival during the period is 0.0001.

For the assumptions used in this example, the specified period N would equal 16 years. Using a computer implementation of the present invention as demonstrated in the preceding, a value for $SPR^m=\$60,022$ can be calculated.

DEFINITIONS

The following definitions of terms used herein will be helpful in understanding the present invention.

"Survival risk" is the financial risk that a third party beneficiary faces from a set of insured lives living longer than expected. While not being held to this explanation, survival risk exists, in part, because the mortality assumptions used to evaluate survival in a group of lives to the end of a specified period are dependent upon the Law of Large Numbers. The Law of Large Numbers states that the mean of a random sample drawn from a large population will approach the mean of the population as the sample size n increases. If a group's size is not large enough, then the survival risk calculated for the group will be subject to "statistical fluctuation" for small values of n.

The Weak Law of Large Numbers states that there exists an integer n such that a sample of size n or larger will have a sample mean which deviates from the population mean by $\leq \epsilon$ with a probability$\geq(1-*)$. Typically, this sample error is expressed in the form of a 95% probability or confidence (when $*=0.05$) that the sample mean will differ from the population mean by $\pm\epsilon$.

In addition, the survival risk exists, in part, because the assumptions initially made in calculating it may have been wrong or the mortality experience of the group may change after the calculation was made.

The "beginning date" is the issue date of a survival risk insurance policy. It is the date on which the risk transfer of the survival risk is made. The beginning date is the start of a specified period.

The "end date" is the end of the specified period of time. For example, 20 years after the beginning date.

A "selected group" is a group of lives selected based on a mortality rating.

A "positive difference between the expected death benefit and an actual death benefit" references the death benefits paid by the original life insurance company which issued the life insurance policy on an insured life. Typically, the difference between the death benefits expected to be paid by the original insurer to the Coverage Recipient and those actually paid by the original insurer to the Coverage Recipient during the specified period will be a positive number or zero.

However, it is also possible that the expected death benefit will be less than the actual death benefit and the difference will be negative. In one embodiment, only positive differences will be paid by a Coverage Provider to a Coverage Recipient under the terms of a survival risk insurance policy. A negative difference does not imply an explicit payment by the Coverage Recipient to the Coverage Provider. Any potential negative difference would be reflected in the premium the Coverage Provider charges for the survival risk insurance policy.

"Transferring ownership" means the Coverage Recipient assigning the original life insurance policies to the Coverage Provider or in some other way assuring that the death benefits of these policies will be paid to the Coverage Provider after the end of the specified period.

The "designated beneficiary" is the entity entitled to receive the death benefit proceeds of a life insurance policy. The designated beneficiary is usually designated by the life insurance policy owner.

"Premium" refers to the premium the Coverage Provider would charge for the survival risk insurance policy it issues, unless otherwise indicated.

An "in force death benefit" of a life insurance policy is the amount, as of a specific date, that would be payable if the life insured under such life insurance policy died on that specified date. With respect to the present invention the specified date is, typically, the end of the specified period.

I claim:

1. A method for a Coverage Provider to provide survival risk insurance to a Coverage Recipient, said method comprising the steps of:
   a) selecting a group of insured lives such that:
      i. each one of said insured lives is covered by an original life insurance policy;
      ii. each one of said original life insurance policies is provided by one or more original life insurance companies;
      iii. each one of said original life insurance policies pays a death benefit, $DB^m$, to said Coverage Recipient upon the death of one of said insured lives m; and
      iv. said insured lives belong to a given mortality class as of a beginning date;
   b) calculating a single premium S1 for said survival risk insurance wherein said single premium S1 is greater than or equal to SPR, wherein $$SPR = \sum_{All\ Policies} SPR^m$$

and wherein:

$$SPR^m = (PV1 - PV3) + \frac{F+G}{100} \cdot DB^m + \frac{E+H}{100} \cdot \frac{Y}{100} \cdot DB^m$$

and wherein:

$$PV1 = v^N \cdot \frac{Y}{100} \cdot DB^m$$

and wherein:

$$PV3 = \left[\sum_{k=0}^{\omega-x-1} v^{k+1} \cdot {}_kp_x \cdot q_{x+k} \cdot T1 + {}_{\omega-x}p_x \cdot v^{\omega-x} \cdot T2\right] \cdot \frac{i}{\ln(1+i)} \cdot DB^m$$

and wherein:

i is an annual effective interest rate representing the cost of use of money of the Coverage Provider;

F is a default risk attributable to said one or more original life insurance companies issuing said original life insurance policies, said F being a percentage of said death benefit $DB^m$ of insured m;

G is a default risk attributable to the Coverage Recipient wherein said G is a percentage of the death benefit of insured m;

T1 is an adjustment factor to reflect any tax attributable to a death benefit receivable by the Coverage Provider;

T2 is an adjustment factor to reflect tax attributable to any endowment receivable by the Coverage Provider;

N is the length of time between said beginning date and said end date, wherein N has the units of years;

E is an expense factor set by said Coverage Provider wherein E is expressed as a percentage of a death benefit $DB^m$;

H is a factor for desired profit set by said Coverage Provider, wherein H is expressed as a percentage of a death benefit $DB^m$;

Y is a percentage applied to a death benefit $DB^m$;

ω is a maturity age of an original life insurance policy;

x is the age of said one of said insureds m as of said beginning date;

${}_kp_x$ is the probability that a given one of said insureds will survive from said beginning date for k years;

${}_{\omega-x}p_x$ is the probability that said one of said insureds will survive from said beginning date to said maturity age, ω;

$q_{x+k}$ is the probability that said one of said insureds will die between the beginning of year k and the end of year k; and k is a number of years past said beginning date;

v is an annual discount rate equal to 1/(1+i); and said step of calculating said single premium is performed on a computer; and c) committing said Coverage Provider to pay said Coverage Recipient a first benefit B1 for said survival risk insurance wherein;

$$B1 = Y * \sum_{All\ Policies} DB^m$$

and wherein said payment of said first benefit B1 is to be due on said end date;

d) committing said Coverage Recipient to pay a set of premiums to said Coverage Provider in exchange for said first benefit B1 wherein said set of premiums has a present value as of said beginning date equal to said single premium S1.

2. The method of claim 1 wherein the set of premiums is one premium.

3. The method of claim 1 wherein said set of premiums comprises annual premiums payable for a premium paying period.

4. The method of claim 1 wherein said end date is on or before the end of the term of a loan, wherein said loan is from said Coverage Recipient to at least one of said insured lives.

5. The method of claim 1 wherein said end date is chosen such that the probability of death of said insureds as of said end date is greater than or equal to 0.75.

6. The method of claim 1 wherein said first benefit B1 paid by said Coverage Provider to said Coverage Recipient as a loan.

7. The method of claim 6 wherein said single premium S1 includes a charge for interest on said loan.

8. The method of claim 1 wherein said single premium is first calculated before said beginning date and then recalculated at least once after said beginning date.

9. The method of claim 1 wherein at least one of said insured lives is impaired.

10. The method of claim 1 which further comprises the step of said Coverage Provider accepting the transfer of ownership of said original life insurance policies from said Recipient such that said Coverage Provider receives the death benefits DBm of said original life insurance policies instead of said Recipient.

11. The method of claim 1 wherein said step of committing said Coverage Provider to pay said Coverage Recipient said first benefit B1 comprises said Coverage Provider signing a contract, said contract stating at least a portion of the terms of said survival risk insurance.

12. The method of claim 1 wherein said step of committing said Coverage Recipient to pay said set of premiums to said Coverage Provider comprises said Coverage Provider signing a contract, said contract stating at least a portion of the terms of said survival risk insurance, and wherein said Coverage Recipient has made a conditional commitment to abide by said contract if said Coverage Provider signs said contract.

13. The method of claim 1 wherein said step of committing said Coverage Recipient to pay said set of premiums to said Coverage Provider comprises said Coverage Provider accepting the actual payment of at least a portion of said set of premiums.

14. The method of claim 1 wherein said single premium S1 is greater than or equal to said SPR plus an amount required to keep said original life insurance policies in force from said beginning date to the date when all of said original life insurance policies either pay their respective death benefits or endow.

15. A method for a Coverage Provider to provide survival risk insurance to a Coverage Recipient said method comprising the steps of:

a) selecting a group of insured lives such that:

i. each one of said insured lives is covered by an original life insurance policy;

ii. each one of said original life insurance policies is provided by one or more original life insurance companies;

iii. each one of said original life insurance policies pays a death benefit, $DB^m$, to said Coverage Recipient upon the death of one of said insured lives m; and
iv. said insured lives belong to a mortality class as of a beginning date;
b) determining a schedule of benefit payments BP to be paid by the Coverage Provider to the Coverage Recipient;
c) calculating a single premium S1 for said survival risk insurance wherein said single premium S1 is greater than or equal to SPR, wherein $$SPR = \sum_{All\ Policies} SPR^m$$

and wherein:

$$SPR^m = (PV1 - PV3) + \frac{F+G}{100} \cdot DB^m + \frac{E+H}{100} \cdot \frac{Y}{100} \cdot DB^m$$

and wherein:
PV1 equals the present value as of said beginning date of said schedule of benefit payments BP;
and wherein:

$$PV3 = \left[ \sum_{k=0}^{\omega-x-1} v^{k+1} \cdot {}_k p_x \cdot q_{x+k} \cdot T1 + {}_{\omega-x}p_x \cdot v^{\omega-x} \cdot T2 \right] \cdot \frac{i}{\ln(1+i)} \cdot DB^m$$

and wherein:
i is an annual effective interest rate representing the cost of use of money of the Coverage Provider;
F is a default risk attributable to said one or more original life insurance companies issuing said original life insurance policies, said F being a percentage of said death benefit $DB^m$ of insured m;
G is a default risk attributable to the Coverage Recipient wherein said G is a percentage of the death benefit of insured m;
T1 is an adjustment factor to reflect any tax attributable to a death benefit receivable by the Coverage Provider;
T2 is an adjustment factor to reflect tax attributable to any endowment receivable by the Coverage Provider;
E is an expense factor set by said Coverage Provider wherein E is expressed as a percentage of a death benefit $DB^m$;
H is a factor for desired profit set by said Coverage Provider, wherein H is expressed as a percentage of a death benefit $DB^m$;
Y is a percentage applied to a death benefit $DB^m$;
ω is a maturity age of an original life insurance policy;
x is the age of said one of said insureds m as of said beginning date;
${}_k p_x$ is the probability that a given one of said insureds will survive from said beginning date for k years;
${}_{\omega-x}p_x$ is the probability that said one of said insureds will survive from said beginning date to said maturity age, ω;
$q_{x+k}$ is the probability that said one of said insureds will die between the beginning of year k and the end of year k; and
k is a number of years past said beginning date;
v is an annual discount rate equal to 1/(1+i); and said step of calculating said single premium is performed on a computer; and
d) committing said Coverage Provider to pay said Coverage Recipient said schedule of said benefit payments BP;
e) committing said Coverage Recipient to pay a set of premiums to said Coverage Provider in exchange for said schedule of said benefit payments BP wherein said set of premiums has a present value as of said beginning date equal to said single premium S1;
f) committing said Coverage Recipient to transfer ownership of said original life insurance policies to said Coverage Provider as of said beginning date such that said Coverage Provider becomes the beneficiary of said original life insurance policies.

16. The method of claim 15 wherein said set of premiums is one premium.

17. The method of claim 15 wherein said set of premiums comprises annual premiums payable for a premium paying period.

18. The method of claim 15 wherein said end date is on or before the end of the term of a loan, wherein said loan is from said Coverage Recipient to at least one of said insured lives.

19. The method of claim 15 wherein said end date is chosen such that the probability of death of said insureds as of said end date is greater than or equal to 0.75.

20. The method of claim 15 wherein said at least a portion of said schedule of benefit payments BP is paid by said Coverage Provider to said Coverage Recipient as a loan.

21. The method of claim 20 wherein said single premium S1 includes a charge for interest on said loan.

22. The method of claim 15 wherein said single premium S1 is first calculated before said beginning date and then recalculated at least once after said beginning date.

23. The method of claim 15 wherein at least one of said insured lives is impaired.

24. The method of claim 15 wherein said schedule of benefit payments BP comprises a single benefit payment, said single benefit payment being equal to the sum of the benefits of said original life insurance policies.

25. The method of claim 24 wherein said single benefit payment is due as of said end date.

26. The method of claim 15 wherein said step of committing said Coverage Provider to pay said Coverage Recipient said schedule of benefit payments BP comprises said Coverage Provider signing a contract, said contract stating at least a portion of the terms of said survival risk insurance.

27. The method of claim 15 wherein said step of committing said Coverage Recipient to pay said set of premiums to said Coverage Provider comprises said Coverage Provider signing a contract, said contract stating at least a portion of the terms of said survival risk insurance, and wherein said Coverage Recipient has made a conditional commitment to abide by said contract if said Coverage Provider signs said contract.

28. The method of claim 15 wherein said step of committing said Coverage Recipient to pay said set of premiums to said Coverage Provider comprises said Coverage Provider accepting the actual payment of at least a portion of said set of premiums.

29. The method of claim 15 wherein said single premium S1 is greater than or equal to said SPR plus an amount required to keep said original life insurance policies in force from said beginning date to the date when all of said original life insurance policies either pay their respective death benefits or endow.

* * * * *